Figure 1:
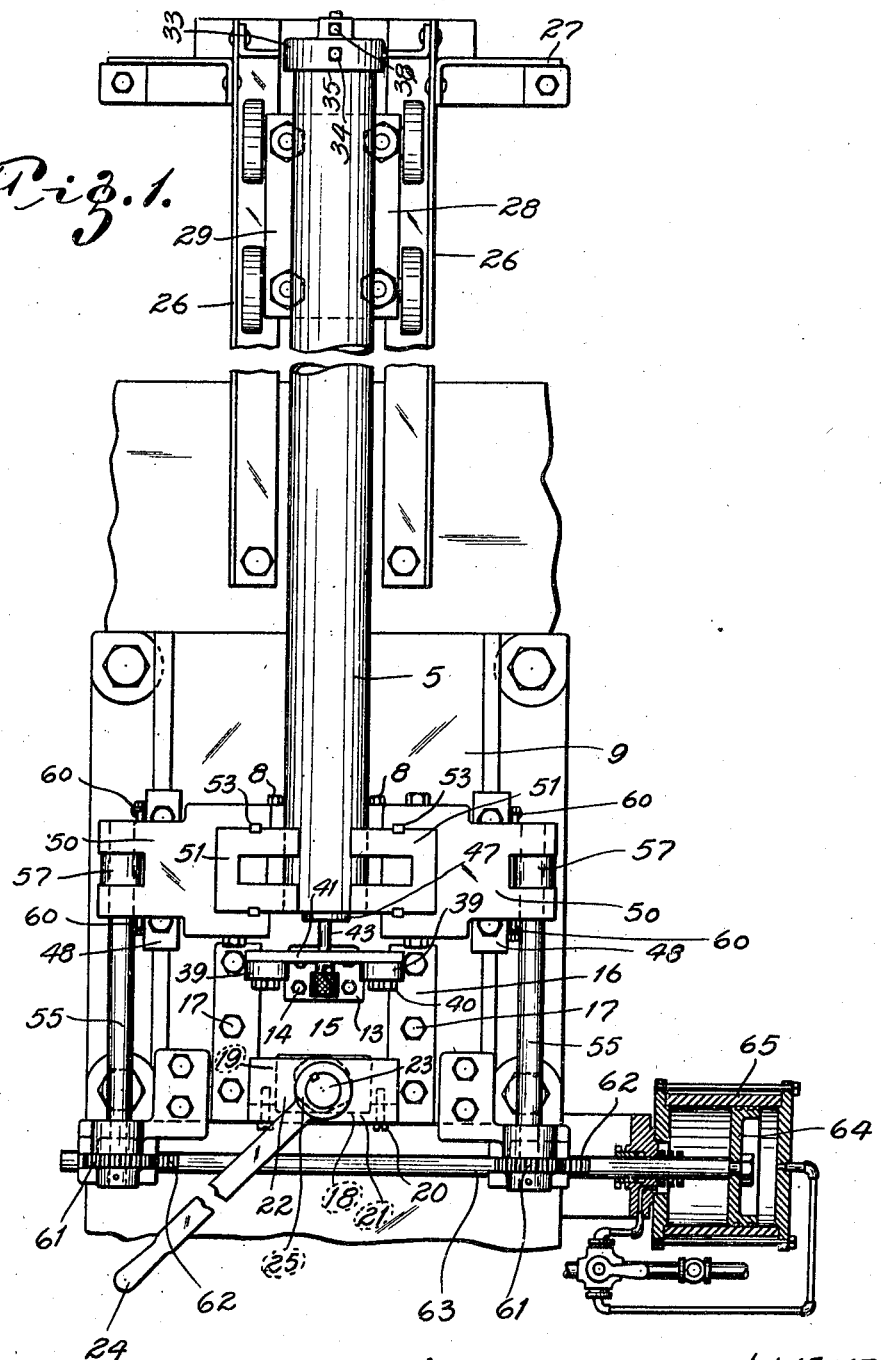

May 28, 1929.  M. T. LOTHROP  1,715,138
TUBE SHEARS
Filed Aug. 7, 1926    5 Sheets-Sheet 1

INVENTOR:
HIS ATTORNEYS

May 28, 1929.  M. T. LOTHROP  1,715,138
TUBE SHEARS
Filed Aug. 7, 1926   5 Sheets-Sheet 2
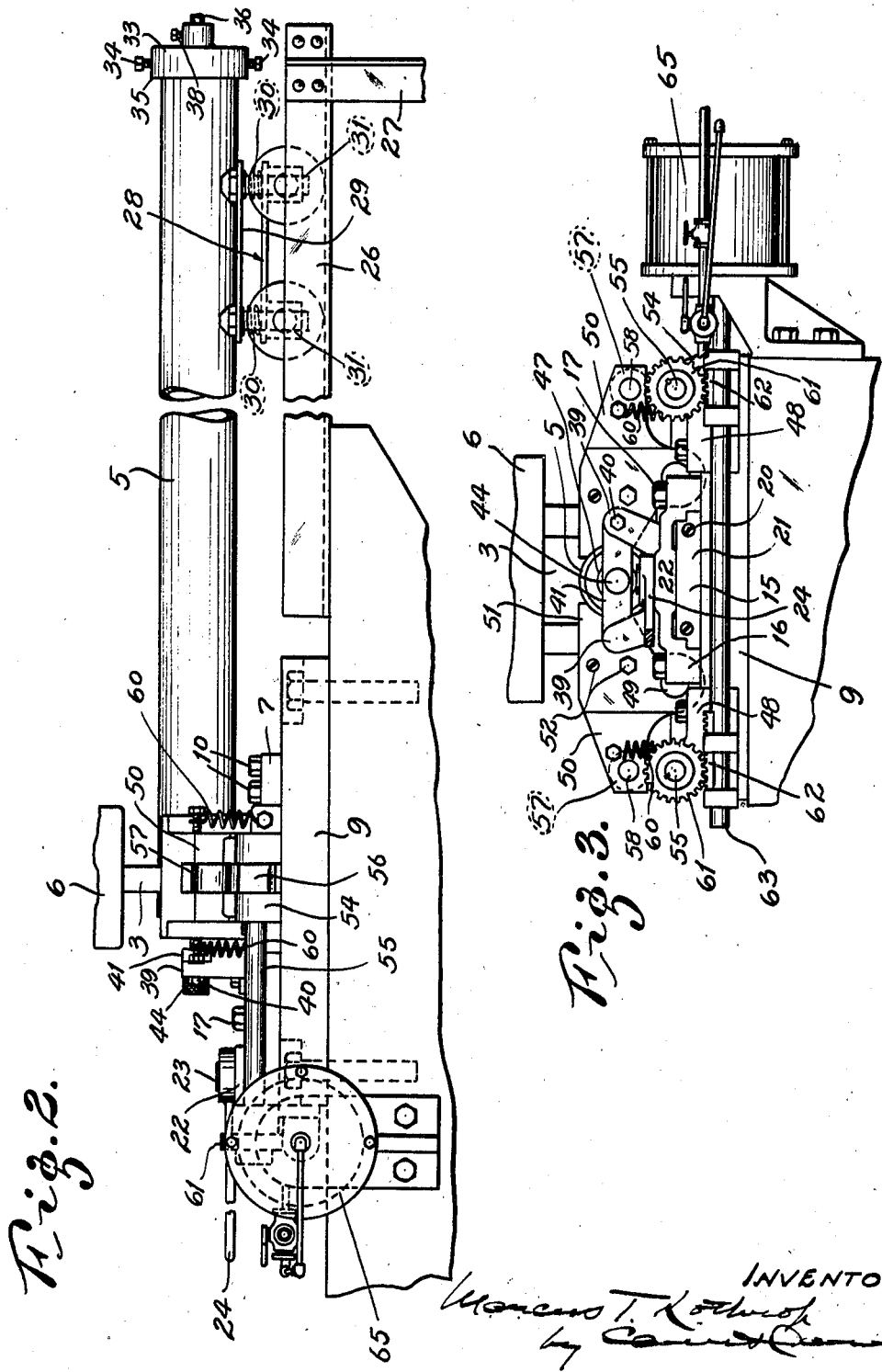
INVENTOR:
HIS ATTORNEYS.

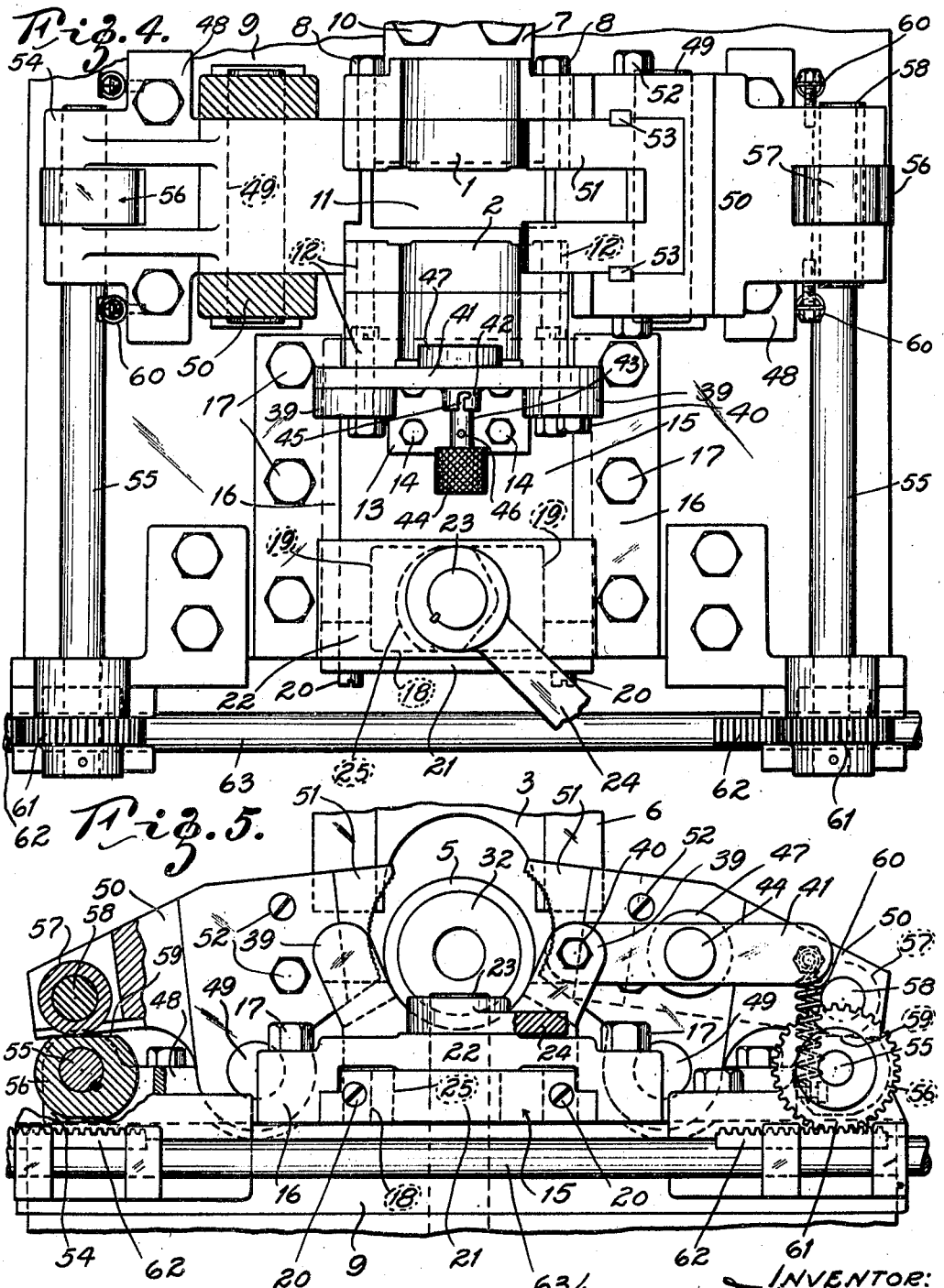

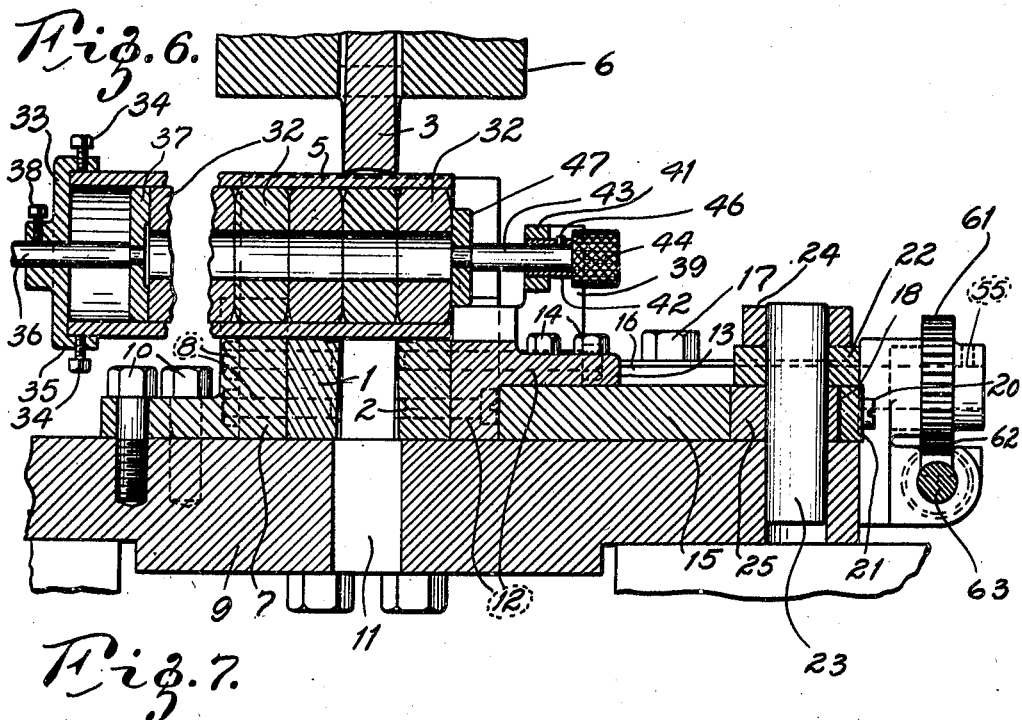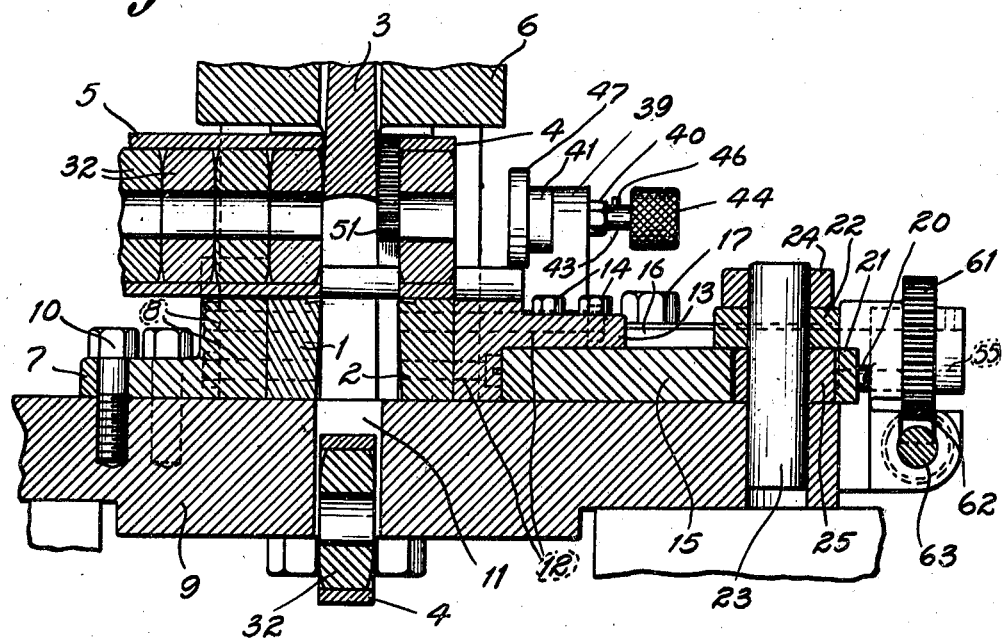

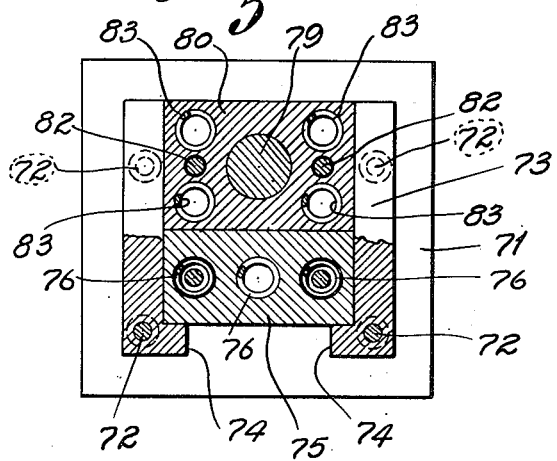
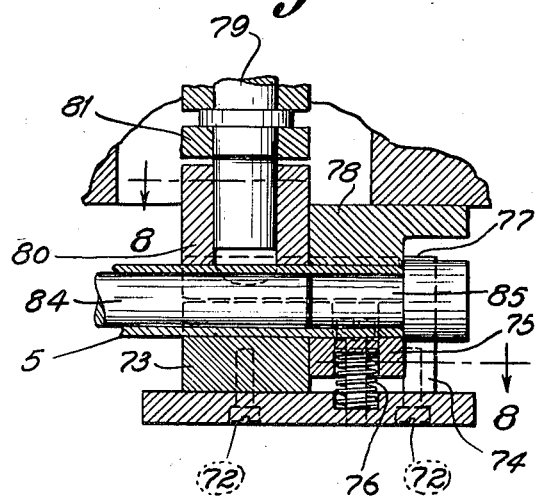
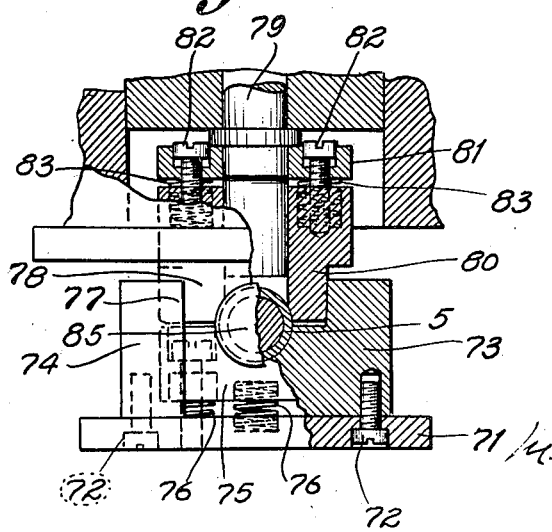

Patented May 28, 1929.

1,715,138

UNITED STATES PATENT OFFICE.

MARCUS T. LOTHROP, OF CANTON, OHIO, ASSIGNOR TO THE TIMKEN ROLLER BEARING COMPANY, OF CANTON, OHIO, A CORPORATION OF OHIO.

TUBE SHEARS.

Application filed August 7, 1926. Serial No. 127,827.

My invention relates to apparatus for making short rings or lengths of tubing from long tubes and has for its principal object a machine for making such rings by shearing off end portions of the tube, thereby eliminating waste and securing economy and simplicity of operation.

The invention consists principally in an apparatus for shearing off end portions of a tube to form slugs or rings without distortion and without waste of metal. The invention further consists in the apparatus and in the parts and combinations and arrangements of parts hereinafter described and claimed.

In the accompanying drawings which form part of this specification and wherein like reference characters indicate like parts wherever they occur, Fig. 1 is a plan view of a tube shearing apparatus embodying my invention, an air cylinder for operating a portion of said apparatus being shown in section, Fig. 2 is a side elevation thereof, Fig. 3 is a part end elevation, Fig. 4 is a plan view of the shearing portion of the machine, on a larger scale than Fig. 1, and showing the parts in different positions from Fig. 1, Fig. 5 is an end elevation, Fig. 6 is a longitudinal sectional view through the tube and shearing dies, Fig. 7 is a similar view showing the shearing dies in moved position, Fig. 8 is a sectional view on the line 8—8 of Fig. 9 showing a modified form of the invention in which only one ring is sheared from the end of the tube, Fig. 9 is a vertical longitudinal sectional view of said modified invention, and Fig. 10 is a vertical cross sectional view.

The preferred form of the invention shown in Figs. 1 to 7, inclusive, is characterized by the use of a pair of lower dies or shear blades (one blade 1 preferably being fixed and the other 2 being movable as hereinafter described) and an upper shear blade or punch 3 disposed in line with the opening between the lower shear blades, whereby when said upper blade 3 is lowered, two rings 4 are sheared from the end of the tube 5.

The upper shear blade or punch 3 is mounted in a holder 6 which is secured to the ram of a press in any suitable manner.

The fixed lower shear blade or die 1 is secured to a support 7 as by screws 8, and said support is secured to the bed 9 of the press, as by screws 10. Extending through said bed in alinement with the opening between the lower shear blades is an opening 11 adapted to receive annular slugs 4 sheared from the tube.

The movably mounted lower shear blade 2 is secured, as by bolts 12 to a support 13, which support is secured, as by bolts 14, to a slide 15. Said slide 15 is mounted in a guide member 16 that is secured to the bed 9, as by bolts 17. Said slide 15 has a recess 18 in the end opposite that to which the shear blade support 13 is secured; and secured to the projecting arms 19 forming the sides of such recess 18, as by screws 20, is a cross-bar 21. The guide member 16 has a raised cross member 22 connecting the two sides thereof; and rotatably mounted in an opening through said cross member 22 of the guide 16 is a pin 23 which is provided at its upper end with an operating lever 24 and at its middle with a cam 25 which works in the recess 18 in said slide member 15, operating against the end wall of the recess 18 and the cross-bar 21 which closes said recess. By means of said cam 25 and its operating lever 24, the slide 15 may be moved forward or backward, thus moving the movable lower die 2 toward or away from the fixed lower die 1.

Suitable means are provided for supporting the tube 5, a preferred form being shown in Figs. 1 and 2 of the drawing. Said supporting mechanism comprises a pair of angle irons 26 disposed with one web vertical and the horizontal webs extending inwardly towards each other, suitably secured at one end to the press and at the other end to a frame 27. Mounted on the track formed by said angle irons is a carriage 28 that is provided with a plate 29 for supporting the tube 5. Preferably said plate 29 rests on springs 30 mounted on suitable supports 31 on the carriage 28. Thus the tube 5 is resiliently supported so as to accommodate any jarring that takes place during the shearing operation.

Mounted in the end portion of the tube 5 and throughout as much more of the length of the tube as may be desired, are plugs 32 whose width is substantially the same as the distance between the lower shear blades. Said plugs are positioned in the tube so that when the tube is in position to be sheared, a plug 32 is directly in line with the upper shear blade. Thus the shearing takes place along both sides of the plug and the tube is supported during the shearing operation. The edges of the plugs 32 may be beveled or rounded off so as to leave a space between the plugs along the shearing edges thereof.

To secure and position the shearing plugs 32 in the tube, a cap 33 is secured on the end of the tube as by screws 34 extending through an annular flanged portion 35 thereof and engaging the tube, said cap having a rod 36 extending therethrough and provided with an enlarged head portion 37 engaging the innermost plug in said tube. A screw 38 is provided for holding said rod 36 in any desired position in the tube. Thus the plugs 32 are put in the tube in the desired position and the rod 36 is moved so that the contact head 37 on the end thereof engages the endmost plug 32, when the set screw 38 is turned to hold the rod in position. In practice the tube will be almost entirely filled with plugs 32 and the rod 36 used to position said plugs.

The movable shear blade support 13 is provided with upstanding wings or lugs 39 to one of which is secured, as by bolt 40, a bar 41 that is adapted to be swung across the end of the tube 5 in the press to rest on the other upstanding lug 39. Fixed in a suitable hole in said bar 41 is a sleeve or collar 42 in which is slidably disposed a rod 43 that has a knurled head 44 by which it may be operated. Said sleeve 42 has a bayonet slot 45 or similar locking slot adapted to cooperate with a locking pin 46 on said rod 43, whereby said rod may be locked in position. At the end of said rod 43 is a plate 47 that is adapted to engage the outermost plug 32 in said tube, that is, said contact plate 47 is adapted to be brought substantially flush with the end of a tube 5 in the press. The plate 47 may be held in this position by turning the rod 43 so that its locking pin 46 is held in the locking slot 45 of the sleeve or collar 42; and when the pin of said rod is withdrawn from the locking slot the bar 41 and rod 43 may be swung away from the end of the tube.

Pivotally mounted on a bracket member 48 on the base, as by pins 49, are levers 50. To each of said clamp levers is secured a clamping jaw 51 as by screws 52 and wedges 53. Said jaws are provided wth arcuate front edge portions that engage the tube. Preferably said contacting edges are serrated to more firmly hold the tube and prevent it from turning. The opening between the two contact portions of each clamping jaw 51 permits the upper shear blade 3 to descend to engage the tube.

Journaled in suitable bearings 54 in each bracket member 48 that supports a clamping lever 50, is a cam shaft 55 on which is a cam 56 that is adapted to engage a roller 57 that is mounted on a pin 58 in the clamping lever 50. Each cam 56 has a flat portion 59. When the roller is in engagement with this flat portion 59 of the cam, the clamping jaws 51 are moved away from the tube, as by springs 60 secured to the outer ends of the clamping levers 50 and to the bracket member or the base. When the cams 56 are turned so that the rollers 57 are in contact with the curved portions thereof, the outer ends of the clamp levers 50 are raised and the contact jaws 51 are lowered into engagement with the tube.

The cam shafts 55 may be operated manually, or by any suitable mechanism, such as that shown in the drawings. As shown in the drawings, each cam shaft 55 is provided with a pinion 61 at its outer end that is adapted to mesh with a rack 62 on a slidably mounted rod 63. Said rod may be connected with a piston 64 that is mounted in a cylinder 65, which cylinder is suitably connected with sources of air pressure or the like, so as to move the piston 64 and rod 63 back and forth.

The operation of the device is believed to be clear from the foregoing, but may be described as follows:

The tube 5, in which are mounted the desired number of shearing plugs 32 is placed on the supporting carriage 28 and brought into position so that the forward end of the tube rests on the lower shear blades 1 and 2. The plugs are positioned and held in the tube by the head 37 on the locating rod 36. The bar 41 is swung into position across the end of the tube and the rod 43 is moved so that the contact plate 47 is in proper position to locate the end of the tube 5, and said tube is pushed forward until the endmost plug 32 therein engages said contact plate. In this position, the edges of the second shearing plug 32 are in line with the shearing edges of the upper and lower shear blades. Then the air cylinder 65 is operated to cause the piston 64 and rod 63 to move forward, thus rotating the cam shafts 56 and causing the clamping devices to be moved to engage the tube.

When the tube is clamped in position, the rod 43 and locating plate 47 are unlocked from the locking collar 42 and the bar 41 is swung clear of the tube, so as not to be damaged in case the endmost shearing plug should be squeezed from the tube. Thereupon the press is tripped to cause the ram to descend carrying with it the upper shear blade 3 and two rings or slugs 4 are sheared from the end of the tube. The shearing action for the lower half of the tube 5 occurs between the lower edges of the second shearing plug 32 and the edges of the lower shear blades 1 and 2. The shearing action for the upper half of the tube 5 occurs between the upper or center shear blade 3 and the rear edge of the first shearing plug 32 and the forward edge of the third shearing plug 32. Preferably the upper shear blade or punch does not have a sufficient stroke to carry it completely through the tube, but only goes far enough to complete the shearing action. This prevents the formation of any fins which might occur if the shear blade were carried on past the freshly sheared section.

After the shearing has taken place, the air cylinder 65 is operated to permit the clamping devices to release the tube. The first or forward plug is removed from the fixture and the slide 15 is moved forward by means of the operating lever 24 and cam 25 so as to move the movable shear blade 2 away from the fixed blade 1 and permit the second ring or slug to fall through the opening 11 in the base. The slide 15 is then returned to bring the movable shear blade 2 in proper operative motion to the other shear blades and the operation is repeated.

In Figs. 8 to 10 is shown a modified form of the invention in which a single slug only is sheared from the end of the tube. A support plate 71 is suitably secured to the bolster of the press. Secured to said plate, as by screws 72, is a die block 73.

Said die block 73 is provided with projecting arms 74 that constitute guides for a support block 75 that is mounted on springs 76 that rest in the support plate 71, said support block 75 constituting a resilient support for the end portion of a tube being sheared. Said die block 73 is also provided with a portion 77 constituting a guide for the upper punch or shear blade 78.

Secured to the auxiliary ram of a double acting press is a projecting mandrel 79 on which is slidably mounted a clamp member 80 having portions adapted to engage the tube 5. Said mandrel 79 is provided with flanged portions 81 in which are mounted screws 82 whose ends are screwed into the clamp member 80. Suitable springs 83 are interposed between the clamp member 80 and said flange 81, said springs tending to move the clamp member away from the flanges to the extent permitted by the screws 82.

The shear blade or punch 78 is secured to the main ram of the press.

In order to support the tube during the shearing operation a suitable plug 84 is inserted therein. In the end of the tube is inserted a distance plug 85 that has a headed end portion whose inner shoulder is adapted to engage the end of the spring pressed support block 76. The length of said plug from the head to the end is the same as the length of the piece that is desired to be sheared from the end of the tube. Thus the shearing takes place along the line between said distance plug 85 and the filler plug 84 extending through the body of the tube.

The above described tube shear device eliminates the waste that is involved in ordinary devices for forming rings from tubes, all of which involve the waste of an amount of metal depending on the width of the cutting or other tool. The device is very quick in its operation, it is simple and economical to operate. The tube is supported on the inside, thus preventing deformation of the annular slugs.

Obviously numerous changes may be made without departing from the invention and I do not wish to be limited to the precise construction shown.

What I claim is:

1. The process of shearing annular slugs from a tube, which comprises placing a plurality of plugs in said tube, the width of said plugs being the same as the width of a shear member of the shearing press, positioning the tube upon members of said press arranged to cooperate with said first mentioned shear member, so that a plug is in alinement with said shear member, and then operating said shear member.

2. A machine for shearing a tube comprising spaced shear members, a shear member disposed above the space between said first mentioned shear members and a plug in said tube in alinement with said second shear member and adapted to cooperate with said first mentioned shear members.

3. In a tube shearing machine or the like, means for positioning the end of a tube in the machine, comprising a support for said tube, a bar spaced away from the end of the tube, a rod mounted in said bar movable toward and away from said support, a contact plate on the end of said rod and means for securing said rod in position.

4. In a tube shearing machine or the like, means for positioning the end of a tube in the machine, comprising upstanding lugs, a bar pivotally attached at one end to one of said lugs, the other end of said bar being adapted to rest on the other lug, a rod mounted in said bar to move axially of the tube, a contact plate on the end of said rod for positioning the end of the tube, means for holding said rod in position, and means for clamping said tube in place, whereby the tube may be positioned by said contact plate, and then said plate, said rod and said bar may be swung clear of said tube.

5. In a tube shearing machine or the like, means for positioning the end of the tube in the machine, comprising upstanding lugs, a bar pivotally attached at one end to one of said lugs, the other end of said bar being adapted to rest on the other lug, a sleeve fixed in said bar and extending axially of said tube, a rod in said sleeve, a contact plate on the end of said rod for positioning the end of the tube, said sleeve being provided with a bayonet slot and a pin on said rod cooperating with said slot to hold said rod in position.

6. A machine for shearing tubes, comprising a bed plate having an opening therethrough, a shear member fixed on said bed plate alongside of said opening, a shear member at the other side of said opening, a support therefor, a shear member above said opening, and means for moving said support for said second shear member, whereby it may be moved away from said opening to permit an annulus sheared from a tube to drop through said opening.

7. In a tube shearing machine or the like, means for clamping a tube in position, comprising levers pivotally mounted between their ends at each side of said tube, one end of each lever being provided with a jaw portion adapted to engage said tube, a cam disposed beneath the other end of each lever, springs holding said ends in engagement with said cams and normally holding said jaw portions out of engagement with said tube, rock shafts, each carrying one of said cams, and means for operating said rock shafts simultaneously.

8. In a tube shearing machine or the like, means for clamping a tube in position, comprising levers pivotally mounted between their ends at each side of said tube, one end of each lever being provided with a jaw portion adapted to engage said tube, a cam disposed beneath the other end of each lever, springs holding said ends in engagement with said cams and normally holding said jaw portions out of engagement with said tube, rock shafts each carrying one of said cams, said rock shafts being each provided with a pinion on the end, and an operating rod having racks that mesh with said pinions.

9. In a tube shearing machine or the like, means for clamping a tube in position, comprising levers pivotally mounted between their ends at each side of said tube, one end of each lever being provided with a jaw portion adapted to engage said tube, a cam disposed beneath the other end of each lever, springs holding said ends in engagement with said cams and normally holding said jaw portions out of engagement with said tube, rock shafts each carrying one of said cams, said rock shafts being each provided with a pinion on the end, an operating rod having racks that mesh with said pinions, said rod terminating in a piston, and an air cylinder in which said piston is mounted.

10. A machine for shearing tubes comprising a bed plate, spaced shear members thereon, a shear member disposed above the space between said lower shear members and arranged to cooperate therewith, means for positioning a tube on said lower shear members, said tube having a plurality of plugs therein adapted to cooperate with said shear members, and means for holding said plugs in position.

11. A machine for shearing tubes comprising a bed plate, shear members thereon, a shear member disposed above the space between said lower shear members and arranged to cooperate therewith, means for positioning a tube on said die members, said tube having a plurality of plugs therein adapted to cooperate with said shear members, and means for holding said plugs in position, said means comprising a cap mounted on the end of said tube and a rod extending through said cap and abutting against the endmost of said plugs.

12. A machine for shearing tubes comprising a bed plate, spaced shear members thereon, a shear member disposed above the space between said lower shear members and arranged to cooperate therewith, means for positioning a tube on said lower shear members, said tube having a plurality of plugs therein adapted to cooperate with said shear members, and means for holding said plugs in position, said means comprising a cap mounted on the end of said tube and a rod extending through said cap and abutting against the endmost of said plugs, said cap being provided with a screw for holding said rod in position.

13. A machine for shearing a tube comprising a bed plate, spaced shear members thereon, a shear member disposed above the space between said lower shear members and arranged to cooperate therewith, means for positioning a tube on said lower shear members, said tube having a plurality of plugs therein adapted to cooperate with said shear members, said plugs being of substantially the same width as said upper shear member and one of said plugs being in alinement with said upper shear member at the beginning of the shearing operation, and means for holding said plugs in position.

14. A machine for shearing a tube comprising spaced shear members, a cooperating shear member disposed in alinement with the opening between said spaced shear members and adapted to cooperate with both of said spaced shear members and a plug in said tube in alinement with said second mentioned shear member.

15. A machine for shearing a tube comprising spaced shear members, a cooperating shear member disposed in alinement with the opening between said spaced shear members and adapted to cooperate with both of said spaced shear members and a plurality of plugs in said tube, said plugs being of substantially the same width as said second mentioned shear member and one of said plugs being disposed in alinement with said second mentioned shear member.

16. A machine for shearing a tube comprising spaced shear members, a cooperating shear member disposed in alinement with the opening between said spaced shear members and adapted to cooperate with both of said spaced shear members and a plurality of plugs in said tube, the greatest width of said plugs being substantially the same as the width of said second mentioned shear member, said plugs having beveled edge portions, and one of said plugs being disposed in alinement with said second mentioned shear member.

17. In a device for simultaneously shearing a tubular blank into a plurality of parts, a plurality of discs adapted to be placed in the bore of said blank, and a set of spaced shearing members adapted to engage the exterior of said blank in a plurality of spaced shearing planes, and cooperate with said discs in shearing.

18. The method of manufacturing annular bodies from a tubular blank consisting in inserting a plurality of discs constituting a mandrel in the bore of said blank, placing said blank between a plurality of shearing elements disposed in offset relation to engage the blank in a plurality of shearing planes, and finally shearing said blank into a plurality of parts.

19. In a device for shearing a tubular blank into a plurality of parts, a support comprising spaced shearing members adapted to engage the exterior surface of the blank, a shearing element disposed in a plane intermediate said shearing members and adapted to engage the interior surface of the blank, and a movable shearing member disposed co-planar with said shearing element and adapted to engage the exterior surface of the blank at the side opposite to said support in shearing.

Signed at Canton, Ohio, this 2" day of Aug., 1926.

MARCUS T. LOTHROP.